US009798164B2

(12) United States Patent
Balsamo et al.

(10) Patent No.: US 9,798,164 B2
(45) Date of Patent: Oct. 24, 2017

(54) ELECTRO-OPTIC DEVICES

(75) Inventors: Stefano Balsamo, Milan (IT); Marco Villa, Cabiate (IT); Michele Belmonte, Milan (IT)

(73) Assignee: Oclara Technology Limited, Caswell, Towcester, Northamptonshire ( * ) Notice: Subject to any disclaimer, the term of this patent is extended or adjusted under 35 U.S.C. 154(b) by 597 days.

(21) Appl. No.: 13/822,250

(22) PCT Filed: Sep. 8, 2011

(86) PCT No.: PCT/GB2011/051683
§ 371 (c)(1),
(2), (4) Date: Apr. 8, 2013

(87) PCT Pub. No.: WO2012/035319
PCT Pub. Date: Mar. 22, 2012

(65) Prior Publication Data
US 2013/0202243 A1    Aug. 8, 2013

(30) Foreign Application Priority Data
Sep. 13, 2010  (GB) .................................. 1015169.4

(51) Int. Cl.
*G02F 1/035*    (2006.01)
*G02B 6/12*    (2006.01)
(Continued)

(52) U.S. Cl.
CPC ................ *G02F 1/011* (2013.01); *B05D 5/12* (2013.01); *G02F 1/0356* (2013.01); *G02F 1/2255* (2013.01); *G02F 2201/122* (2013.01)

(58) Field of Classification Search
None
See application file for complete search history.

(56) References Cited

U.S. PATENT DOCUMENTS 4,683,448 A     7/1987  Duchet et al.
5,074,631 A *  12/1991  Hamano et al. .................. 385/3
(Continued)

FOREIGN PATENT DOCUMENTS

EP     0150752 A2     8/1985
EP     1217425 A1     6/2002
EP     1901109 A1     3/2008

OTHER PUBLICATIONS

PCT International Search Report and Written Opinion, Application No. PCT/GB2011/051683 dated Dec. 5, 2011, 12 pages.
(Continued)

*Primary Examiner* — Hemang Sanghavi
(74) *Attorney, Agent, or Firm* — Fenwick & West LLP

(57) ABSTRACT

An electro-optic device 200 comprising a substrate in which first and second waveguides 202, 203 are formed. The device also comprises first and second electrodes 204, 205 comprising an optically transparent conductive material and including primary portions 204a, 205a overlying the first and second waveguides 202, 203 for electrically biasing the first and second waveguides. The device is configured such that one of the first and second electrodes includes one other portion 204b, 205b arranged alongside the primary portion 204a, 205a of the other of the first and second electrodes. This arrangement improves the electro-optic efficiency of the device without the need for a buffer layer in the electrodes.

15 Claims, 8 Drawing Sheets

(51) Int. Cl.
*G02F 1/01* (2006.01)
*B05D 5/12* (2006.01)
*G02F 1/225* (2006.01)

(56) References Cited

U.S. PATENT DOCUMENTS

| | | |
|---|---|---|
| 6,480,633 B1 | 11/2002 | Fleming et al. |
| 6,853,757 B2 | 2/2005 | Seino |
| 7,290,328 B2* | 11/2007 | Kondo et al. ............... 29/825 |
| 2002/0110302 A1 | 8/2002 | Gopalakrishnan |
| 2003/0053730 A1 | 3/2003 | Seino |
| 2006/0198581 A1* | 9/2006 | Belmonte et al. ............ 385/40 |
| 2008/0031564 A1 | 2/2008 | Sugiyama |
| 2008/0044124 A1 | 2/2008 | Sugiyama |
| 2008/0170818 A1 | 7/2008 | Kissa et al. |
| 2008/0193074 A1 | 8/2008 | Sugiyama |
| 2008/0212914 A1* | 9/2008 | Marks ............... B82Y 20/00 385/2 |
| 2010/0034496 A1* | 2/2010 | Oikawa ............. G02F 1/0356 385/2 |
| 2010/0086252 A1* | 4/2010 | Kinpara et al. ............... 385/2 |

OTHER PUBLICATIONS

GB Search Report, Application No. GB1015169.4 dated Dec. 17, 2010, 4 pages.

\* cited by examiner

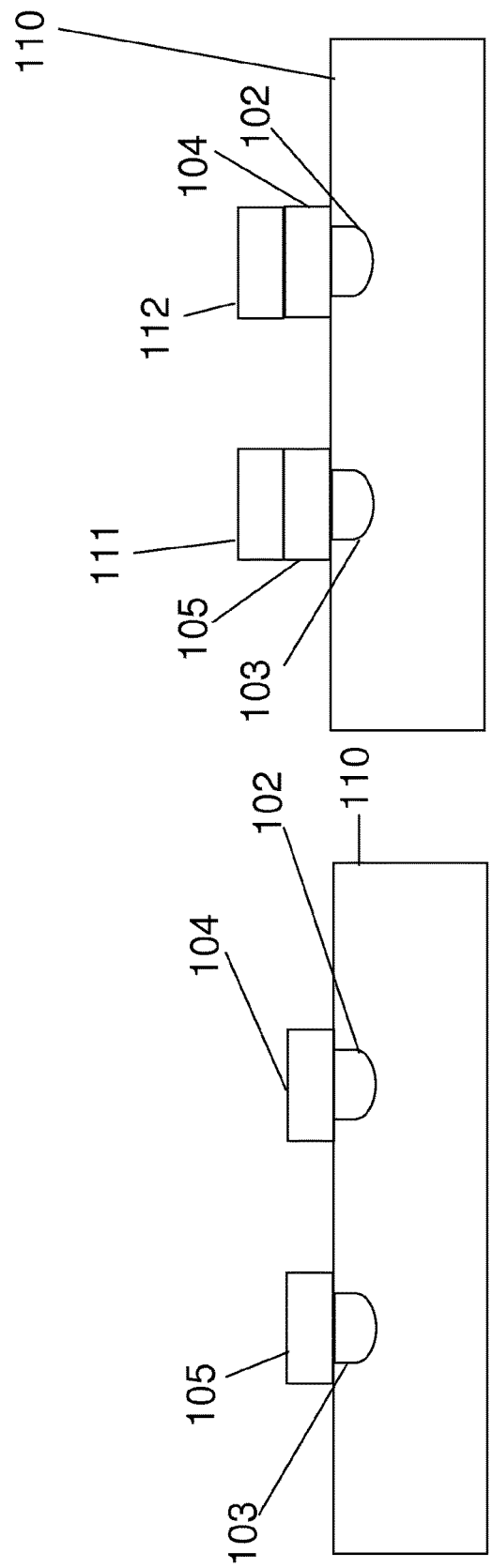

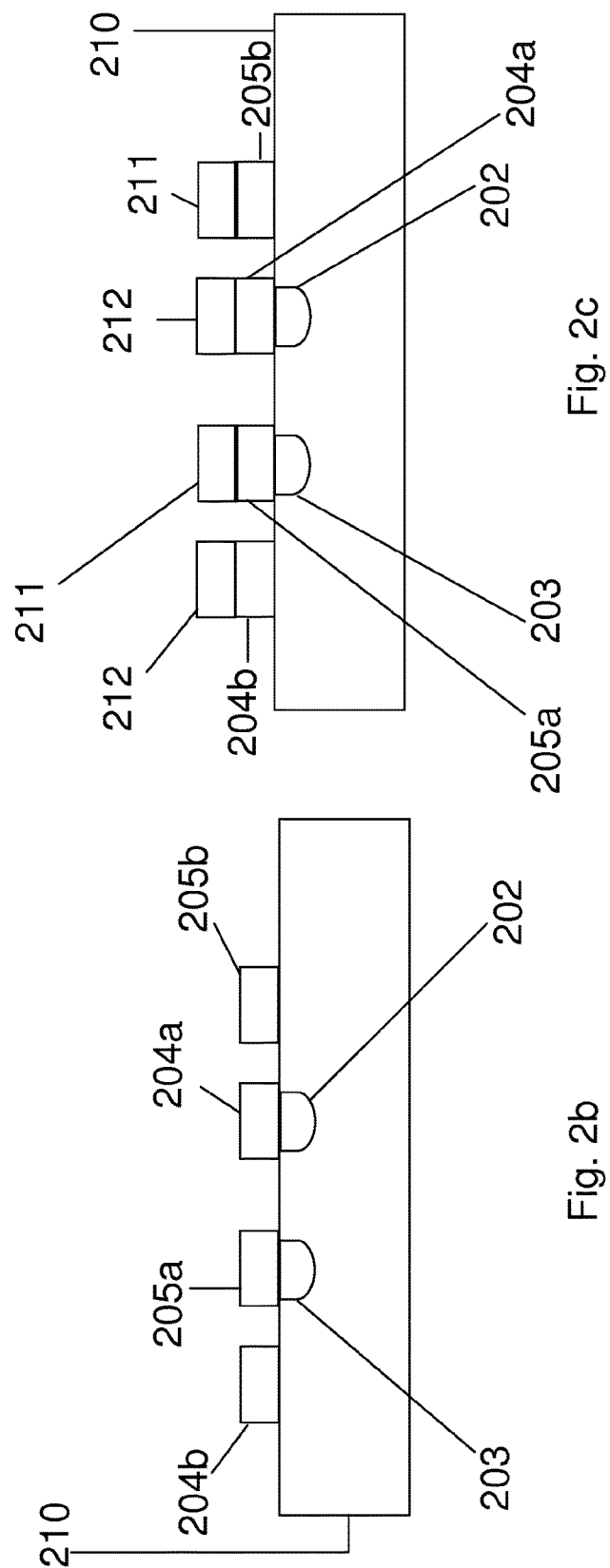

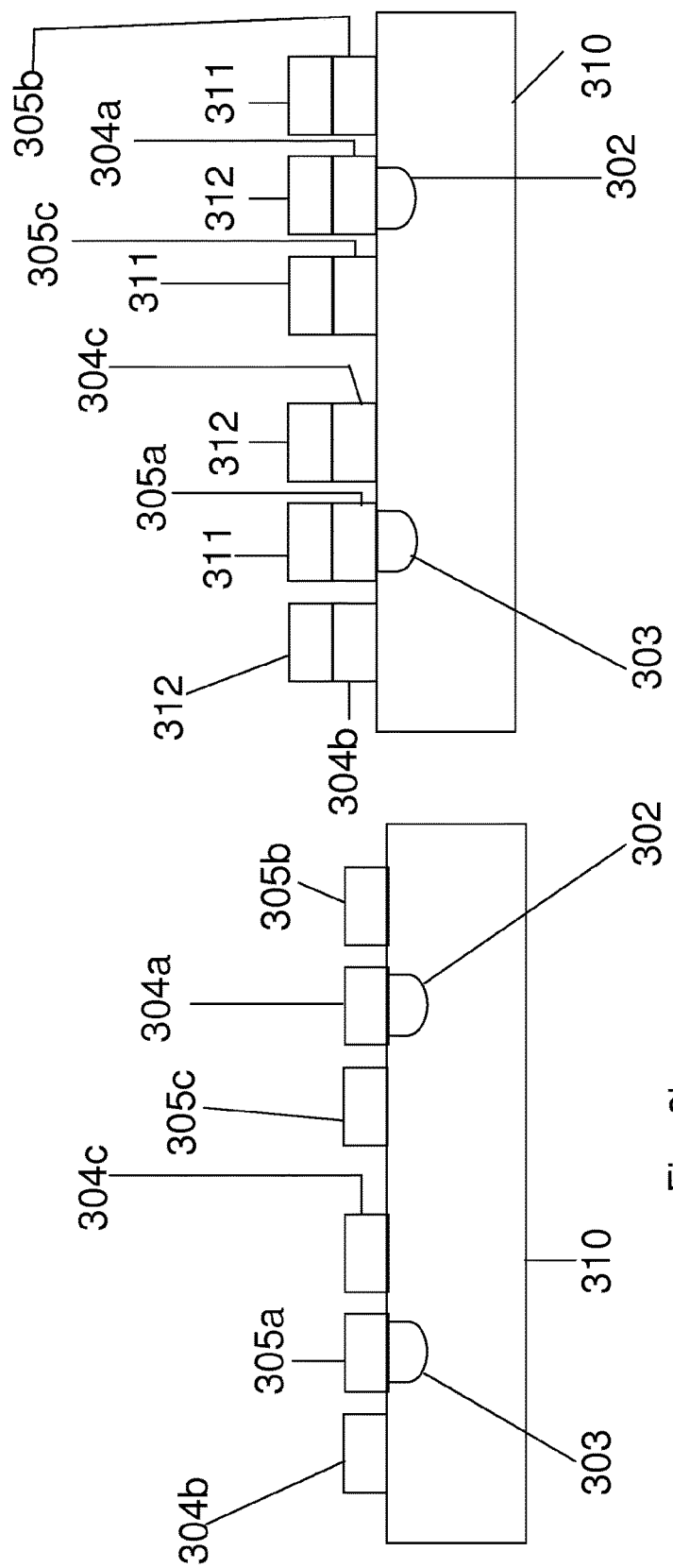

ELECTRO-OPTIC DEVICES

RELATED APPLICATIONS

This application is a 35 U.S.C. 371 national stage filing of International Application No. PCT/GB2011/051683, filed on Sep. 8, 2011, which claims priority to United Kingdom Patent Application No. 1015169.4, filed on Sep. 13, 2010. The contents of the aforementioned applications are hereby incorporated by reference.

FIELD OF THE INVENTION

This invention relates to electro-optic devices.

BACKGROUND OF THE INVENTION

Electro-optic devices are critical components of optical communication systems. By electrically changing the refractive index of material in an optical pathway, they can switch, attenuate or modulate an optical signal.

A commonly used electro-optic device, e.g. an optical modulator, uses an electrical field to control the behaviour of light in a waveguide path at the surface of an electro-optic substrate (e.g. a lithium niobate ($LiNbO_3$) substrate). The electrical field applied to the waveguide region can vary the refractive index in the path. The electrode used to apply the field is generally a conventional metallic electrode placed directly on the substrate. However, in order to prevent high optical loss, the metallic electrode has to be placed at some distance from the waveguide. This results in low electro-optic efficiency. This is defined as high $V_\pi$.

Alternatively, a buffer layer could be provided between the waveguide and the metal electrode. This in turn offers improved $V_\pi$ of the modulator. Materials such as $SiO_2$ (which is optically transparent) are quite commonly used as the buffer layer. Nevertheless the buffer layers suffer from strong DC drift effects, which are potentially dangerous for the long-term stability of the device. This needs to be controlled and stabilized at a given operating point (e.g., quadrature, maximum, minimum) to achieve good performance. Another known solution is a buffer made entirely of transparent conductor, e.g. indium tin oxide (ITO).

Such a transparent conductor is a semiconductor material which possesses both electrical conductivity and low optical losses (e.g., ITO or other similar materials). Conventionally, in this way, such electrodes have a three-layer structure so that the transparent buffer layer is formed on the optical waveguide with a metal electrode on top of it.

Suitable arrangements for such a three-layer structure are disclosed in U.S. Pat. No. 6,853,757 and U.S. Pat. No. 6,480,633. For the arrangements of these documents, it is possible that light leaks out from the transparent electrode to the metal electrode, and in particular, under high-speed modulation, optical loss caused by leaking out cannot be disregarded.

Thus there is a need for an improved bias electrode design for the electro-optic devices, which is capable of reducing optical loss.

SUMMARY OF THE INVENTION

According to one aspect of the present invention, there is provided an electro-optic device comprising a substrate and first and second waveguides formed at the surface of the substrate. The device further comprises an electrode assembly overlying the waveguides. The electrode assembly comprises a DC bias section. The DC bias section comprises a first electrode which comprises an optically transparent conductive material and overlays a first waveguide for applying a DC voltage to the first waveguide, and a second electrode which comprises an optically transparent conductive material and overlays a second waveguide for applying a DC voltage to the second waveguide.

According to another aspect of the present invention there is provided an electro-optic device comprising a substrate and first and second waveguides formed at the surface of the substrate. The device further comprises a first electrode which comprises an optically transparent conductive material and includes at least a primary portion overlying the first waveguide for electrically biasing the first waveguide with a DC voltage, and a second electrode which comprises an optically transparent conductive material and includes at least a primary portion overlying the second waveguide for electrically biasing the second waveguide with a DC voltage. At least one of the first and second electrodes includes at least one other portion arranged alongside the primary portion of the other of the first and second electrodes so as to improve the electro-optic efficiency of the device.

This invention enables a separate bias electrode to be designed which is entirely made of a transparent conductor (e.g. ITO or a similar material), with a suitable composition. The electrode arrangement is capable of reducing or minimising optical losses while allowing the DC biasing of a waveguide without the need for buffer layers in the bias region. This arrangement is capable of reducing DC drift effects considerably.

Preferably, the at least one other portion of each electrode is parallel to the primary portion of the other electrode and may comprise two parallel fingers either side of the primary portion of the other electrode. Conveniently, the at least one other portion of each electrode is configured to be in contact with the substrate and do not overlay the waveguides. The width of the primary portion of the first and second electrodes may be larger than the width of the respective waveguides.

Preferably, the electro-optic device further comprises a metallic layer on top of the first and second electrodes so as to improve the AC bandwidth in a high frequency operation.

Typically the AC conductivity of ITO is not large enough to be used as a high-frequency sine tone to drive and control the operating point of the device. The arrangement having the metallic overlay enables higher conductivity (typically above the kHz range) and preserves the low-loss electrode approach. This arrangement also increases the bandwidth of the electrode to several orders of magnitude.

The metallic layer may not fully cover the first and second electrodes. This means the width of the metallic overlay is narrower than the width of the ITO electrodes.

Conveniently, the metallic layer is a gold (Au) layer. Gold is preferable to other metals because of its high conductivity and low refractive index (real part) over the operational optical wavelength range (1480 nm to 1620 nm). This is capable of reducing optical losses induced on the waveguide underneath the sandwiched electrode.

According to another aspect of the present invention, there is provided an electro-optic device comprising a substrate, and first and second waveguides formed at the surface of the substrate. The device also comprises an electrode assembly for driving the waveguides. The electrode assembly comprises a RF section for driving the waveguides with a RF signal, and a DC bias section for applying a DC voltage to the waveguides. The RF section comprises transparent electrodes configured to be used as buffer layers for RF applications.

According to another aspect of the present invention, there is provided a method of manufacturing an electro-optic device, comprising forming a substrate and forming first and second waveguides at the surface of the substrate. The method further comprises depositing a first electrode comprising an optically transparent conductive material and including at least a primary portion overlying the first waveguide for electrically biasing the first waveguide, and depositing a second electrode comprising an optically transparent conductive material and including at least a primary portion overlying the second waveguide for electrically biasing the second waveguide. At least one of the first and second electrodes includes at least one other portion arranged alongside the primary portion of the other of the first and second electrodes so as to improve the electro-optic efficiency of the device.

According to another aspect of the present invention, there is provided a method of manufacturing a DC bias section of an electro-optic device for biasing optical waveguides formed on a substrate. The method comprises depositing a first electrode comprising an optically transparent conductive material of the DC bias section on a first waveguide for applying a DC voltage to the first waveguide. The method further comprises depositing a second electrode made of a transparent conductive material of the DC bias section on a second optical waveguide for applying a DC voltage to the second optical waveguide.

BRIEF DESCRIPTION OF THE DRAWINGS

In order that the invention may be more fully understood, a number of embodiments of the invention will now be described, by way of example only, with reference to the accompanying drawings, in which:

FIG. 1b is a cross-sectional view of a DC bias section for use in the arrangement of FIG. 1a, FIG. 1c is a cross-sectional view of an alternative DC bias section for use in the arrangement of FIG. 1a, FIG. 2a is a schematic plan view of an alternative electro-optic modulator, FIG. 3b is a cross-sectional view of a DC bias section for use in the arrangement of FIG. 3a, FIG. 3c is a cross-sectional view of an alternative DC bias section for use in the arrangement of FIG. 3a, and FIG. 3d shows the experimental results for $V_\pi$ for the arrangements of FIG. 2a and FIG. 3a.

DETAILED DESCRIPTION OF THE DRAWINGS

Figure 1A:
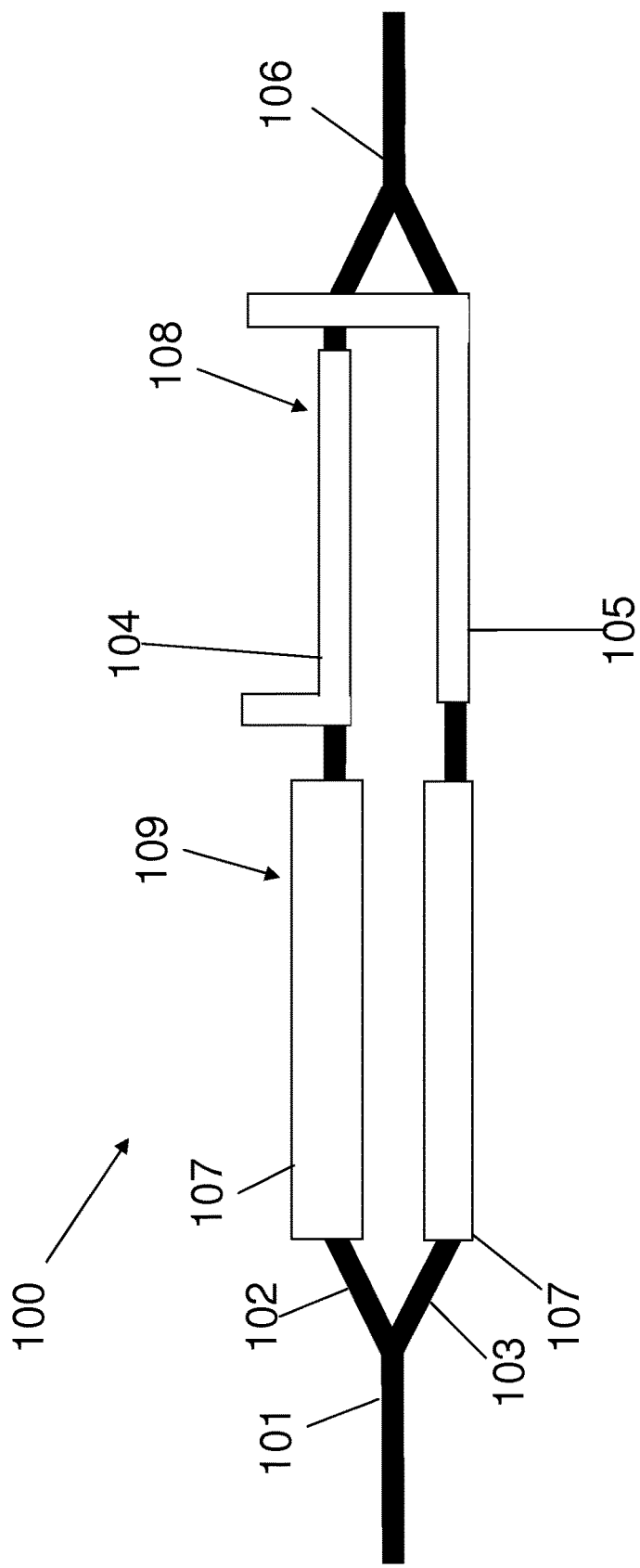
FIG. 1a is a schematic top view of an electro-optic modulator.

FIG. 1a is a schematic top view of a Mach-Zehnder type electro-optic modulator 100. The modulator 100 comprises an electro-optic substrate (not shown) made of LiNbO$_3$ crystal. An input optical waveguide 101 is formed by diffusing titanium (Ti) on the substrate. Phase shift optical waveguides 102, 103 are branched from the input waveguide 101. An output optical waveguide 106 is connected to an outgoing side of the phase shift optical waveguides 102, 103. The optical modulator 100 also comprises bias sections 108, 109 for biasing the phase shift waveguides 102, 103. One bias section 108 is a DC bias section 108 and comprises positive and negative ITO electrodes 104, 105 in a pair of phase shift waveguides 102, 103, for DC biasing the waveguides 102, 103. The other section 109 is a RF section 109 and comprises metal electrodes 107 (made of Au, Ti/Au, Cr/Au or similar) driven by an RF signal.

For the arrangement of FIG. 1a, light (not shown) incident on the input waveguide 101 is divided into two branches, and after passing the phase shift waveguides 102 and 103, is made to join in the output waveguide 106. At this point, if two beams of light passing the phase shift waveguides 102 and 103 respectively have the same phase as they join, the outgoing light (not shown) has high amplitude. However, if the two beams of light passing the phase shift waveguides 102 and 103 respectively join with opposite phases, the amplitude of the outgoing light is small. Thus, the electro-optical effect of the waveguides 102, 103 under the electrodes changes according to the amplitude of an applied voltage.

FIG. 1b is a cross-sectional view of a DC bias section 108 for use in the arrangement of FIG. 1a. The waveguides 102, 103 are formed by diffusing Ti on the surface of a LiNbO$_3$ crystal substrate 110. Two transparent conductor ITO electrodes 104, 105 are formed over the waveguides 102, 103 for applying a DC voltage to the waveguides. This arrangement allows differential driving of the bias electrodes. The ITO electrodes 104, 105 allow DC biasing of the modulator without any need for buffer layers in the DC bias section 108. This arrangement reduces optical loss and DC drift effects.

FIG. 1c is a cross-sectional view of an alternative DC bias section 108 for use in the arrangement of FIG. 1a. Many features are similar to those of the arrangement of FIG. 1b, carrying the same reference numerals. This arrangement further includes metallic overlays 111, 112 which are formed on top of the ITO electrodes 104, 105 to result in a multiple layer structure. This arrangement improves the AC conductivity in the kHz range.

Figure 2A:
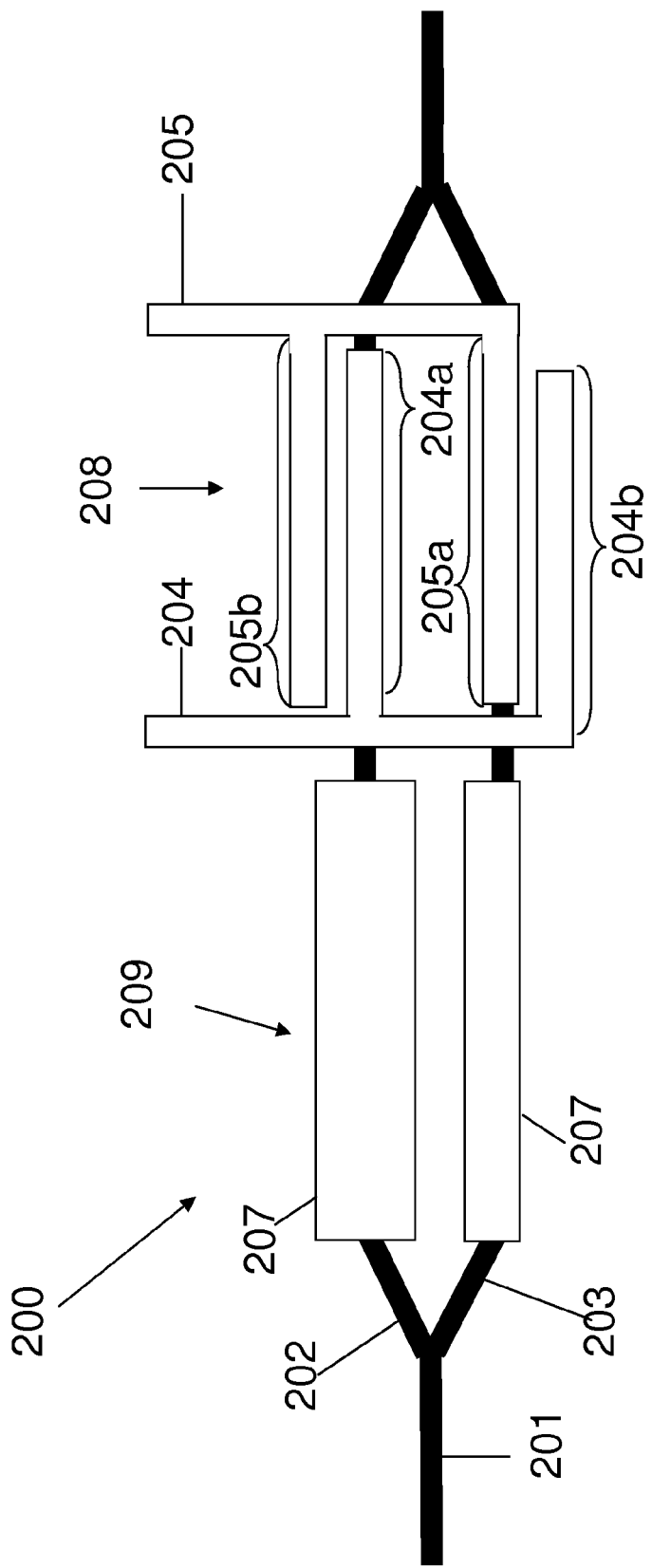
FIG. 2b is a cross-sectional view of a DC bias section for use in the arrangement of FIG. 2a, FIG. 2c is a cross-sectional view of an alternative DC bias section for use in the arrangement of FIG. 2a, FIG. 2d shows an experimental demonstration of the DC drift performance for the arrangements of FIG. 1a and FIG. 2a, FIG. 3a is a schematic plan view of an alternative electro-optic modulator.

FIG. 2a is a schematic plan view of an alternative electro-optic modulator. As with the arrangement of FIG. 1a, the modulator 200 comprises an input waveguide 201, phase shift waveguides 202, 203, an output waveguide 206, a DC bias section 208 comprising two ITO electrodes 204, 205, and a RF section 209 comprising metal electrodes 207. In this embodiment, each ITO electrode 204, 205 has an additional branch 204b, 205b not overlying the respective waveguide. This arrangement provides a co-planar electrode layout.

In FIG. 2a, the first ITO electrode 204 comprises first and second electrode branches 204a, 205b. Similarly, the second ITO electrode 205 comprises first and second electrode branches 205a, 205b. The first branch 204a of the first ITO electrode 204 overlays one of the phase shift waveguides 202, and the first branch 205a of the second ITO electrode 205 overlays the other of the phase shift waveguides 203. The second branch 204b of the first electrode 204 is located beside and parallel to the first branch 205a of the second electrode 205. Similarly, the second branch 205b of the second electrode 205 is located beside and parallel to the first branch 204a of the first electrode 204. It will be appreciated that the branched configuration is provided by way of example only: other configurations will be apparent to the skilled person.

FIG. 2b is a cross-sectional view of a DC bias section 208 for use in the arrangement of FIG. 2a. The waveguides 202, 203 are formed by diffusing Ti on the surface of a LiNbO$_3$ crystal substrate 210. The first and second electrodes 204, 205 are formed on the phase shift waveguides 202 and 203, respectively. The second branch 205a of the second electrode 205 is located beside the first branch 204a of the first electrode 204. Similarly, the second branch 204b of the first electrode 204 is located beside the first branch 205a of the second electrode 205. The second branches 204b and 205b of the first and second electrodes 204, 205 are located directly on the substrate 210 and do not overlay the respective phase shift waveguides 202, 203.

FIG. 2c is a cross-sectional view of an alternative DC bias section 208 for use in the arrangement of FIG. 2a. Many features are similar to those of the arrangement of FIG. 2b and carrying the same reference numerals. This arrangement also includes metallic overlays 211, 212 which are formed on top of the ITO electrodes 204, 205 to improve the AC conductivity in the kHz range.

Figure 2D:
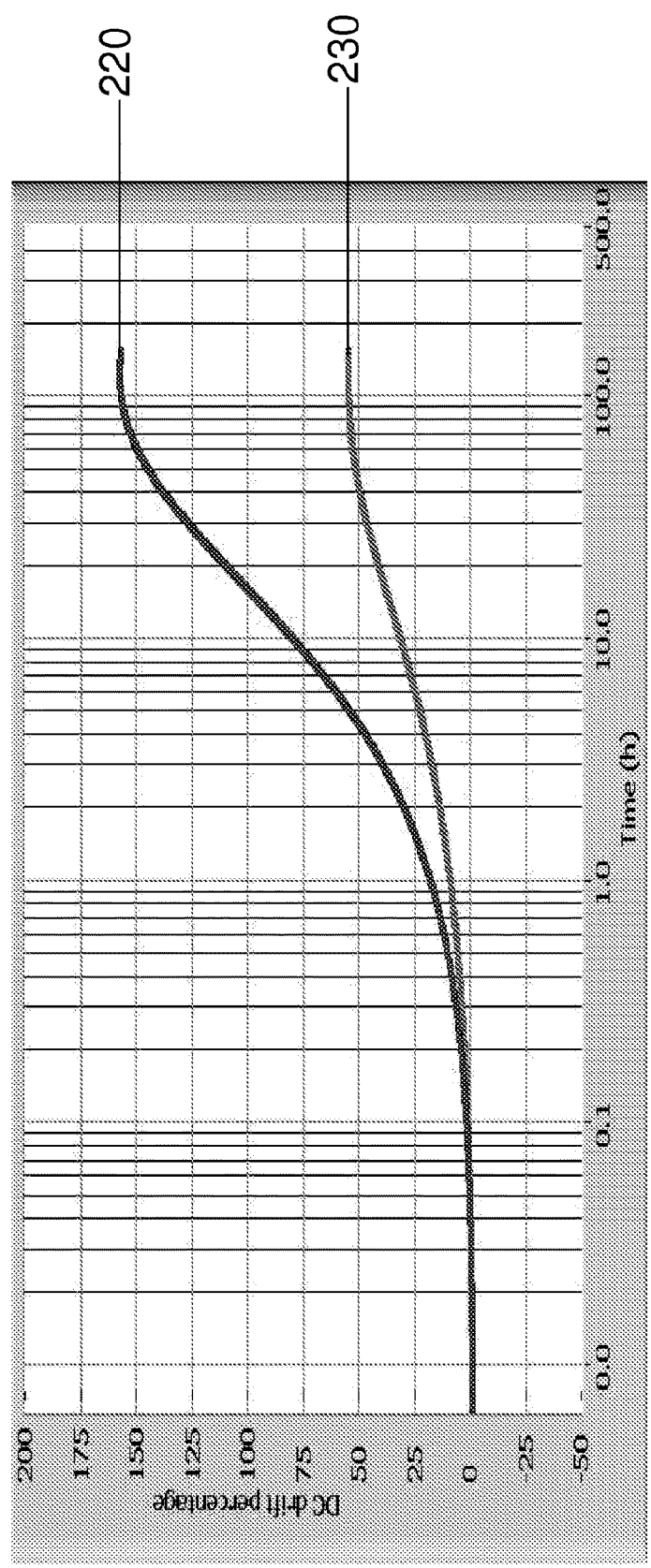

FIG. 2d shows an experimental demonstration of the DC drift performance for the arrangements of FIG. 1a and FIG. 2a. As can be seen, the DC drift performance (curve 230) is significantly improved for the co-planar arrangement of FIG. 2a compared to the DC drift performance (curve 220) for the arrangement of FIG. 1a. In the co-planar arrangement of FIG. 2a, V$_\pi$ of the bias section is decreased. Thus this arrangement reduces the voltage that needs to be applied to the DC section 208 and reduces the electro-optic "stress" applied to the substrate bias region. Moreover, the push-pull structure of FIG. 2a provides more protection from the DC drift effects because of the reduced spacing of positive electrode 204 and negative electrode 205 in each couple As a result, the DC drift performance has improved significantly as shown in FIG. 2d. Since the biasing can be provided by the difference between the applied voltages to these electrodes 204, 205, the role of the positive and negative electrodes can be altered.

Figure 3A:
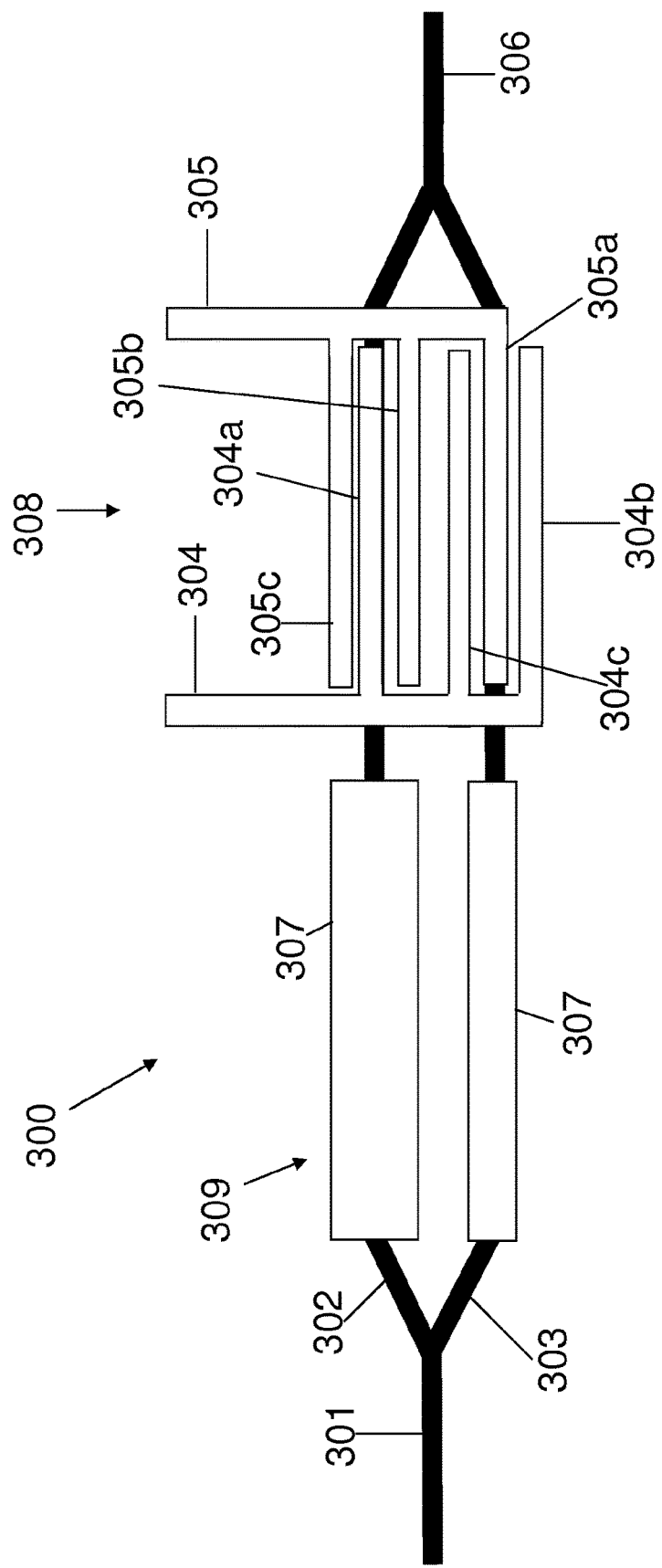

FIG. 3a is a schematic plan view of an alternative electro-optic modulator. As with the arrangements of FIG. 1a and FIG. 2a, the modulator 300 comprises input waveguide 301, phase shift waveguides 302, 303, output waveguide 306, a DC bias section 308 comprising two ITO electrodes 304, 305, and a RF section 309. In this embodiment, each ITO electrode 304, 305 has additional branches 304b, 304c, 305b, 305c not overlying the respective waveguides 302, 303. This arrangement provides a 'double' co-planar electrode layout which gives a completely symmetric electrode layout for each waveguide 302, 303.

In FIG. 3a, the first ITO electrode 304 comprises three branches: a first electrode branch 304a, a second electrode branch 304b and a third electrode branch 304c. Similarly the second ITO electrode 305 comprises three branches: a first electrode branch 305a, a second electrode branch 305b and a third electrode branch 305c. The arrangement is such that the first branches 304a, 305a of the first and second ITO electrodes 304, 305 overlays phase shift waveguides 302 and 303, respectively. The first branch 305a of the second electrode 305 is arranged to be in between the second and third branches 304b, 304c of the first electrode 304. Similarly the first branch 304a of the first electrode 304 is configured to be in between the second and third branches 305b, 305c of the second electrode 305.

FIG. 3b is a cross-sectional view of a DC bias section 308 for use in the arrangement of FIG. 3a. As with the arrangement of FIG. 2b, the waveguides 302, 303 are formed on the surface of a LiNbO$_3$ crystal substrate 310. The first and second electrodes 304, 305 are formed on the phase shift waveguides 302 and 303, respectively. The first branch 304a of the first electrode 304 is located in between the second and third branches 305b and 305c of the second electrode 305. Similarly, the first branch 305a of the second electrode 305 is located in between the second and third branches 304b and 304c of the first electrode 304. The second and third branches 304b, 304c, 305b and 305c of the first and second electrodes 304, 305 are located directly on the substrate 310 and do not overlay the respective phase shift waveguides 302, 303.

FIG. 3c is a cross-sectional view of an alternative DC bias section 308 of the arrangement of FIG. 3a. Many features are similar to those of the arrangement of FIG. 3b and carrying the same reference numerals. This arrangement also contains the metallic overlays 311, 312 which are placed on top of the ITO electrodes 304, 305 to improve the AC conductivity in the kHz range.

Figure 3D:
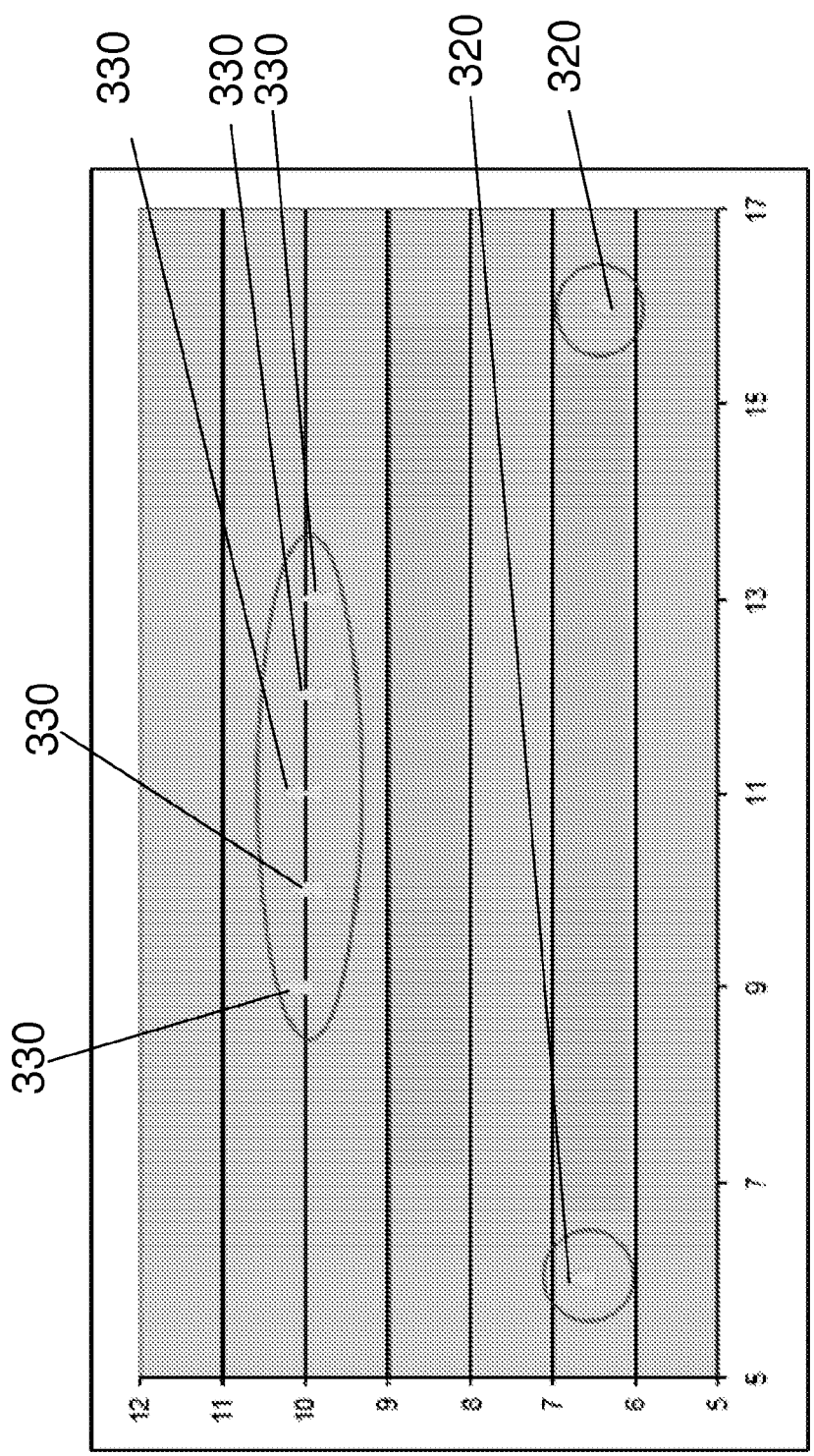

FIG. 3d shows the experimental results for V$_\pi$ for the arrangements of FIG. 2a and FIG. 3a. The 'double' co-planar electrode structure 304, 305 of FIG. 3a provides a smaller V$_\pi$ (points 320) and better electro-optical efficiency compared to those (points 330) of the co-planar electrode structure 204, 205 of FIG. 2a. The 'double' co-planar structure provides lower electro-optic stress as 35% reduction in V$_\pi$ is shown in FIG. 3d.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. An electro-optic device comprising:
   a substrate;
   first and second waveguides formed at the surface of the substrate; and
   an electrode assembly for driving the waveguides,
   wherein the electrode assembly comprises a DC bias section and an RF section, the DC bias section consisting of:
      a first electrode entirely made of an optically transparent conductive material and overlying the first waveguide for applying a DC voltage to the first waveguide, and
      a second electrode entirely made of an optically transparent conductive material and overlying the second waveguide for applying a DC voltage to the second waveguide; and
      wherein the first and second electrodes do not comprise a buffer layer.

2. The device of claim 1, wherein the first and second electrodes do not comprise a buffer layer.

3. The device of claim 1, wherein the RF section comprises transparent electrodes configured to be used as buffer layers for RF applications.

4. The device of claim 1, wherein the electrode assembly is configured to drive the waveguides using an RF signal.

5. The device of claim 1, wherein the first and second electrodes comprise indium tin oxide.

6. A lithium niobate (LiNbO$_3$) optical modulator incorporating the electro-optic device according to claim 1.

7. An electro-optic device comprising:
a substrate;
first and second waveguides formed at the surface of the substrate; and
an electrode assembly for driving the waveguides,
wherein the electrode assembly comprises a DC bias section, the DC bias section consisting of:
a first electrode entirely made of an optically transparent conductive material and overlying the first waveguide for applying a DC voltage to the first waveguide, and
a second electrode entirely made of an optically transparent conductive material and overlying the second waveguide for applying a DC voltage to the second waveguide, wherein:
the first electrode includes at least a primary portion overlying the first waveguide for electrically biasing the first waveguide,
the second electrode includes at least a primary portion overlying the second waveguide for electrically biasing the second waveguide, and
at least one of the first and second electrodes includes at least one other portion arranged alongside the primary portion of the other of the first and second electrodes so as to improve the electro-optic efficiency of the device; and
wherein the first and second electrodes do not comprise a buffer layer.

8. The device of claim 7, wherein the at least one other portion of each electrode is parallel to the primary portion of the other electrode.

9. The device of claim 7, wherein the at least one other portion of each electrode comprises two parallel fingers either side of the primary portion of the other electrode.

10. The device of claim 7, wherein the at least one other portion of each electrode is configured to be in contact with the substrate and not overlaying the waveguides.

11. The device of claim 7, wherein the width of the primary portion of the first and second electrodes is larger than the width of the respective first and second waveguides.

12. The device of any of claim 7, wherein the first and second electrodes are arranged in a co-planar or a double co-planar layout.

13. An electro-optic device comprising:
a substrate,
first and second waveguides formed at the surface of the substrate, and
an electrode assembly for driving the waveguides,
wherein the electrode assembly comprises:
an RF section for driving the waveguides with a RF signal, and
a DC bias section for applying a DC voltage to the waveguides,
wherein the RF section comprises transparent electrodes configured to be used as buffer layers for RF applications;
wherein the DC bias section consists of:
a first electrode entirely made of an optically transparent conductive material and overlying the first waveguide for applying a DC voltage to the first waveguide, and
a second electrode entirely made of an optically transparent conductive material and overlying the second waveguide for applying a DC voltage to the second waveguide; and
wherein the first and second electrodes do not comprise a buffer layer.

14. A lithium niobate (LiNbO$_3$) optical modulator incorporating the electro-optic device according to claim 13.

15. A method of manufacturing an electrode assembly of an electro-optic device, the electrode assembly comprising a DC bias section, for biasing optical waveguides formed on a substrate, and an RF section, the method comprising:
depositing a first electrode entirely made of an optically transparent conductive material of the DC bias section directly on a first waveguide without a buffer layer for applying a DC voltage to the first waveguide, and
depositing a second electrode entirely made of an optically transparent conductive material of the DC bias section directly without a buffer layer on a second optical waveguide for applying a DC voltage to the second optical waveguide.

* * * * *

UNITED STATES PATENT AND TRADEMARK OFFICE
CERTIFICATE OF CORRECTION

PATENT NO. : 9,798,164 B2
APPLICATION NO. : 13/822250
DATED : October 24, 2017
INVENTOR(S) : Stefano Balsamo, Marco Villa and Michele Belmonte Page 1 of 1

It is certified that error appears in the above-identified patent and that said Letters Patent is hereby corrected as shown below:

On the Title Page

Under item (73), Assignee: "Oclara Technology Limited" to read as -- Oclaro Technology Limited --

Signed and Sealed this
Twenty-eighth Day of May, 2019

Andrei Iancu
*Director of the United States Patent and Trademark Office*